Patented Oct. 17, 1933

1,931,325

UNITED STATES PATENT OFFICE 1,931,325

TREATMENT OF LIVING PLANT SURFACES

Clive N. Pillsbury, Akron, Ohio, assignor to The B. F. Goodrich Company, New York, N. Y., a corporation of New York No Drawing. Application September 19, 1931
Serial No. 563,902

12 Claims. (Cl. 47—58)

This invention relates to the horticultural industries and has as its principal object to provide a protective treatment for living plants during certain critical periods of their life history.

Many plants are grown commercially on an enormous scale in nurseries and are successively transplanted into new locations and finally to their final location in orchard or garden at an advanced stage of growth. Certain of them are even dug up in the fall and stored out of the ground over winter before being replanted in new locations in the spring. In the course of this transplanting operation the roots are unavoidably damaged so that the plant when replanted is unable to absorb moisture and nutritional elements from the soil at its normal rate. If the evaporation of moisture from the leaves and branches by normal transpiration exceeds the amount absorbed through the roots, the plant speedily withers and dies. In order to overcome excessive evaporation the leafy branches may be drastically pruned away, but nevertheless the mortality of transplanted stock has always been very high.

In many cases the plants have died in storage or during transit from one location to another by reason of evaporation of moisture from the roots and branches. It has therefore been customary to dig up a ball of earth surrounding the roots and to transfer the plant with the earth as nearly intact as may be, or alternately, to wrap the roots in moist moss, burlap, or other absorbent material. These expedients have involved the transportation of huge masses of inert material, sometimes aggregating a ton or more in the case of particularly large trees, thus enormously increasing the mechanical difficulties of transplanting.

The inevitable damage to the roots and other parts of the plant, as well as the deliberate pruning of the branches, expose the plants in a very critical period of their existence to infection by numerous plant pests, including fungous diseases, insect attacks, etc. Such infections are particularly prevalent in storage cellars and in such places often spread rapidly from plant to plant.

Attempts have heretofore been made to overcome the difficulties mentioned above by treating the plants with protective films of a relatively impervious nature, including oils and waxes. Oils, however, are toxic to many varieties of plants, and because of their permanently fluid condition do not form adequately permanent films on the plant surfaces. Waxes, on the other hand, are necessarily applied in a heated molten condition, and if applied too hot damage the plants, while if applied too cold they form an unsightly and wasteful deposit which readily cracks and breaks away from the plant surfaces. The wax in any case, has to be applied with considerable care, in order to prevent its reaching the roots, for the hot wax treatment of the roots has not been found to be permissible.

The objects of this invention therefore include the provision of means for protecting plant surfaces against excessive evaporation and against disease, particularly during transplanting and during winter storage out of the ground. Other objects will be apparent from the following description of the invention.

According to this invention the plant surfaces are covered with a thin film of rubber or a rubber composition. This is most readily accomplished by dipping the plant in a vat of a liquid solution or dispersion of rubber, but may likewise be accomplished by brushing, spraying, or by other equivalent means. The rubber may be employed in the form of a solution or "cement" in any rubber solvent which is not toxic to the particular plants which are to be treated, but for general use a solution in a high grade completely volatile gasoline, that is, a gasoline entirely free from the toxic kerosene or heavy oil fractions is most suitable. The rubber may likewise be employed in the form of an aqueous dispersion such as natural rubber latex or similar artificially prepared dispersions. Such aqueous rubber-bearing liquids are particularly valuable in the treatment of sensitive plants which may be damaged by the ordinary rubber solvents, or for use where the fire hazard associated with the use of gasoline is to be avoided. The rubber may contain pigments, fillers, softeners, or other additive ingredients including insecticides and fungicides if desired. Other rubber-like materials such as gutta-percha, synthetic rubber, reclaimed rubber, etc., may likewise be used, either in admixture with rubber, or as a substitute therefor.

The film of rubber, while not completely impervious so as to prevent the transpiration necessary to the life of plants, is sufficiently impervious to retard greatly the evaporation of moisture, and to prevent injury by many insect pests, or infection by spores of fungous pests. On the other hand, the rubber film is soft and resilient and is readily penetrated by leaf buds, etc., hence does not appreciably interfere with growth of the plant. When pure rubber is employed it is quite transparent and does not noticeably change the appearance of the plant, aside from imparting ing a certain gloss to the surface. It permits inspection of plants in transit and in quarantine stations without the necessity of disrupting the protective coating.

As a specific example of one embodiment of this invention a number of roses dug up in the fall for winter storage were divided into two groups, one of which was stored without treatment. The plants of the other group were dipped into a 10% solution of rubber in gasoline, so that the canes were well covered with the rubber. After drying to eliminate the gasoline, the treated plants were stored in the same cellar as the other, untreated, plants. At planting time in the spring the treated plants were in excellent condition, the canes being green to their tips, or at the most, having blackened and died back only a few inches. The untreated plants, on the other hand, suffered extensively, the canes in many cases having died back to the roots, and many of them were affected by mildew and molds. When planted, the treated plants took root promptly and grew vigorously, whereas the untreated plants grew far more slowly and showed a high mortality.

In another test a number of roses were transplanted, and the roots were dipped promptly in a rubber solution and then dried. The plants were then left with the roots exposed to a warm, dry atmosphere for a day before they were replanted. The treated plants required from two to three days longer to resume active growth than similar plants whose roots were covered with wet moss, but then grew vigorously and soon caught up with the untreated plants. This delay is doubtless to be ascribed to the fact that the film of rubber is only slightly permeable to water so that the absorption of moisture required to start root growth is retarded. However, as soon as a little moisture has penetrated the rubber and stimulated the roots, the buds growing out from the roots penetrate the soft rubber film and effect a direct contact of the new root growth with the soil, and normal active growth proceeds rapidly. The permeability of the rubber to water may be increased somewhat by the addition of rosin or other fillers. Somewhat better results are secured by dipping the entire plant in the rubber solution.

In the practice of grafting, the coating of the scions with a film of rubber is of great advantage in preventing the scions from drying out, both before and after the actual grafting operation and until a firm union of the parts is secured and growth resumed. They are preferably coated just after severance from the parent stock, and are united to their new hosts in any one of the usual manners.

It is to be understood that this invention is not limited to the specific examples given above for illustrative purposes, but that it is applicable generally to the protection of plants of the most various kinds, especially to woody plants such as trees and shrubs, including fruit trees, shade trees, hedge plants, flowering and ornamental shrubs, etc. The rubber may be applied to the plant surfaces even before the plant is removed from the ground, or at any desired time thereafter, but preferably as soon as possible after removal from the ground. The thickness of rubber applied may likewise be varied to suit individual conditions.

I claim:

1. The process of protecting living plants which comprises coating the entire surface of a major portion of the plants with a thin film of substantially pure rubber.

2. The process of protecting living plants which comprises coating the entire surface of a major portion of the plants with a film of a liquid consisting substantially of pure rubber dispersed in a volatile liquid, and drying to deposit the rubber on the plant.

3. The process of protecting living plants which comprises coating the entire surface of a major portion of the plants with a solution of rubber in a volatile organic solvent, and evaporating the solvent.

4. The process of protecting living plants which comprises coating the entire surface of a major portion of the plants with an aqueous dispersion of substantially pure rubber, and evaporating the water therefrom.

5. In the process of transplanting, the step of coating a substantial portion of the surface of the plants with a thin film of rubber within a short time after the plants are removed from the ground.

6. In the process of transplanting, the step of coating the leaves and branches of the plants with a thin film of rubber before replanting them.

7. In the process of transplanting, the step of coating the roots of the plants with a thin film of rubber within a short time after the plants are removed from the ground.

8. In the process of transplanting, the step of coating substantially the entire surface of the plants with a film of rubber within a short time after the plants are removed from the ground.

9. The process of transplanting which comprises digging up the plants, promptly dipping them in a rubber-bearing liquid, drying them, transporting them to their new location, and replanting them.

10. The process of transplanting which comprises digging up the plants, promptly immersing the entire plants in a solution of rubber in a volatile solvent, evaporating the solvent, transporting the plants to their new location, and replanting them.

11. The process of grafting which comprises severing a scion from its parent stock, coating it with a thin film of rubber, transporting it to its new host and uniting it to its host.

12. The process of transplanting which comprises digging up the plants, promptly immersing the entire plants in an aqueous dispersion of rubber, evaporating the water content of the dispersion, transporting the plants to their new location, and replanting them.

CLIVE N. PILLSBURY.